(12) United States Patent
Madison, Jr. et al.

(10) Patent No.: US 8,019,706 B2
(45) Date of Patent: Sep. 13, 2011

(54) STORAGE SYSTEM DYNAMIC CLASSIFICATION

(75) Inventors: Carl T. Madison, Jr., Winsdor, CO (US); John R. Kostraba, Jr., Thornton, CO (US)

(73) Assignee: Oracle America, Inc., Redwood City, CA (US)

( * ) Notice: Subject to any disclaimer, the term of this patent is extended or adjusted under 35 U.S.C. 154(b) by 674 days.

(21) Appl. No.: 12/147,241

(22) Filed: Jun. 26, 2008

(65) Prior Publication Data

US 2009/0327180 A1    Dec. 31, 2009

(51) Int. Cl.
*G06E 1/00* (2006.01)
*G06E 3/00* (2006.01)

(52) U.S. Cl. .............................. 706/15; 707/652; 380/44

(58) Field of Classification Search ...................... 706/15
See application file for complete search history.

(56) References Cited

U.S. PATENT DOCUMENTS

| 7,711,711 B1 * | 5/2010 | Linnell et al. ................ 707/652 |
| 2006/0004820 A1 * | 1/2006 | Claudatos et al. ............ 707/101 |

* cited by examiner

*Primary Examiner* — Omar Fernandez Rivas
*Assistant Examiner* — Kalpana Bharadwaj
(74) *Attorney, Agent, or Firm* — Marsh Fischmann & Breyfogle LLP; Jonathon A. Szumny; Kent A. Lembke

(57) ABSTRACT

The classification of data stored on a storage medium is dynamically modified without the data being relocated to another storage medium. Data stored on a plurality of storage mediums is classified independent of the physical location at which the data resides. Rather than moving data to storage media that possess different classifications, the data itself receives a classification apart from the storage medium. Data which is considered high priority would be afforded maximum use of the storage medium resources and bandwidth availability. Data that is of lower interest is classified with a lower classification resulting in differing levels of resources authorized to access that data. Throughout this reclassification process the data remains resident on the same storage medium.

20 Claims, 3 Drawing Sheets

STORAGE SYSTEM DYNAMIC CLASSIFICATION

BACKGROUND OF THE INVENTION

1. Field of the Invention

Embodiments of the present invention relate, in general, to storage systems and particularly to dynamic classification of data maintained within a plurality of storage systems.

2. Relevant Background

The storage of data occurs on many mediums including flash drives, magnetic disks, magnetic tape, optical disks and the like. Each medium is associated with an initial cost to procure the medium and operational costs to store and retrieve data. These expenses, combined with differing performance characteristics such as access speed, have driven the industry to adopt a tiered storage system.

A tiered storage system, as is currently typical in the art, places new data or data which is likely to be in high demand on a first tier. As data ages or becomes less important, it is shifted to a second, third or lower tier as appropriate. Each lower tier is typified by slower access time and lower cost associated with storing data. Thus a typical three tier storage system may have as a first tier a certain amount of flash memory. Flash memory is, in comparative terms, expensive per byte of storage capacity. Flash memory also offers extremely fast access to the data. Thus tier one is characterized by a limited capacity of quickly accessible, expensive data. Eventually data that resides on the flash will be replaced by other, more important data. The replaced data is then likely moved to a lower tier in the storage architecture.

The second tier generally has a larger storage capacity than the first tier, is somewhat slower with respect to accessibility and is cheaper. In this example, the second tier is comprised of magnetic disks. According to the storage system of the prior art, once data is identified as having a higher priority for tier 1 space than the data currently residing in the flash memory, the data currently on tier, is moved into tier 2 thus providing space for the new data. Assuming that there is space in tier 2, no other data needs to be removed to make room for the new arrival. However, there remains a cost for keeping data available in tier 2 storage. The disks and the facilities must be maintained, and in many circumstances this overhead is significant.

Thus a third tier of storage exists in which data that is likely not to require immediate or even quick access can be placed. Generally tier 3 is comprised of magnetic tape. Magnetic tape requires a low initial investment but does possess a considerable latency with respect to data access. In many circumstances, however, a business may wish to archive data. The decreased cost of this storage makes high access latency an affordable tradeoff for such data.

In a tiered storage system as described above, data is constantly moving. Data that is no longer worthy of tier 1 storage is copied to tier 2. Data in tier 2 that has not been accessed for a prescribed period of time is moved to tier 3. Data that is required for analysis is retrieved from tier 3 and placed in tier 2 or tier 1. This is compounded by the fact that within each tier there may be additional classifications. For example in tier 2 of the previous example using magnetic disks, data stored on the outside of the disk inherently possesses better access time than data stored near the spindle. Thus that data may be at tier 2.1 while other data may be designated 2.x.

Finally, associated with each storage tier is a bandwidth cost. To move or access data a certain amount of bandwidth must be utilized. Assuming there is a finite amount of bandwidth for a particular system, the bandwidth used to transfer data cuts into the bandwidth needed to access and use the data. Typically storage mediums operate at a maximum setting. When a piece of data is accessed, it is accessed and transported at the maximum rate at which the device can physically operate. However, as systems have evolved such a maximum effort is not always necessary. A challenge therefore exists to balance the cost of storing data with that of accessing the data.

SUMMARY OF THE INVENTION

Dynamic classification of data stored on a storage medium is hereafter disclosed by way of example. Embodiments of the present invention classify data stored on a plurality of storage mediums independent of the physical location at which the data resides. Rather than moving data to storage media that possess different classifications, the data itself receives a classification apart from the storage medium. Data which is considered high priority would be afforded maximum use of the storage medium resources and bandwidth availability. Data that is of lower interest is classified with a lower classification resulting in differing levels of resources authorized to access that data.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to one embodiment of the present invention, a system for dynamic data classification creates and modifies a data's classification without altering the data's physical location. Data placed on a storage medium is associated with a data classification which may reside with the data on the storage medium or may reside at another location. As the need for the data changes, the classification is altered rather than moving data to a storage medium that inherently possesses different capabilities. The modifiable classification alters resources allocated to process the data. Data that is classified as first tier data, or data possessing the highest priority, is, according to one embodiment of the present invention, given full access to the storage medium's resources. Those data portions that are of lower priority are classified as such resulting in less resources being expended on their behalf.

According to another embodiment of the present invention, a method for dynamic data classification is presented. A data classification is associated with each data portion stored on a storage medium. Each data portion is associated with its unique classification. As the need for the data changes, the classification of the data is modified to reflect the changing status of the data. Characteristics of the storage medium such as access resources and bandwidth to communicate the data to other components are managed based on the classification of data. While the classification of the data may change, the data itself remains resident on the storage medium. Only the resources associated with the data are modified.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
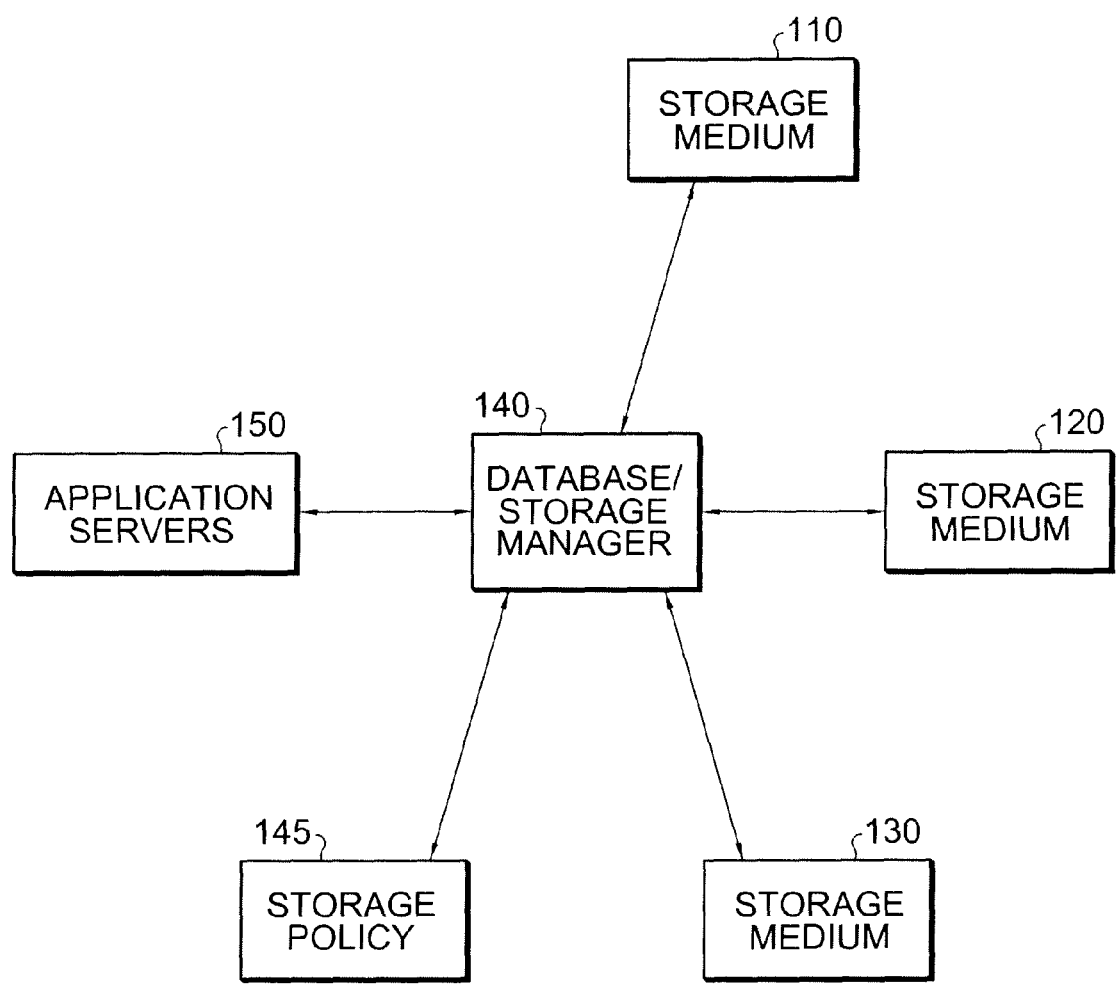
FIG. 1 shows a high level block diagram of a storage area network in which one embodiment for the dynamic classification of data can be implemented.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIG. 1 is a high level block diagram of a storage area network in which one embodiment of the present invention for dynamic data classification can be implemented. As shown, a storage network comprises a plurality of storage mediums 110, 120, 130. According to this rendition, each of the storage mediums is communicatively coupled with a database or storage manager 140. Of course one skilled in the relevant art will recognize that storage area networks may comprise a plurality of differing storage mediums and have multiple avenues through which to access and manage the data. In FIG. 1 an application server 150 is coupled to the database manager 140 which in turn is coupled to the various storage mediums 110, 120, 130.

In other embodiments, web servers may have immediate access to certain storage mediums while other application servers and mainframes may access data via various switches. As previously described, in a traditional storage network data is moved to various storage mediums based on the capability of those mediums and the need to access data. Tape drives for example are generally cheaper to maintain but possess a higher latency with respect to data access. Thus as data becomes less likely to be accessed immediately, it is typically moved to a tape storage medium or the like from a medium that may have possessed a faster access time but at the cost of more bandwidth utilization and cost.

According to one embodiment of the present invention, data remains where it is initially stored. Only the classification of the data is altered. Data that is in high demand and identified as being data that must be immediately available is classified as tier 1 data. While the data remains where it is originally stored, the resources necessary to access and convey the data are increased so that the data can be immediately accessed consistent with its classification.

As shown in FIG. 1, the data classification is maintained in the database/storage manager 140. In other embodiments, the classification data resides with the actual data on the plurality of storage mediums 110, 120, 130. As the need for the data changes according to enterprises data storage policies, the data classification is altered. In one embodiment, the data policies and rules 145 are accessed by the database/storage manager 140 so as to automatically and dynamically modify data classification. For example, data that has not been accessed for more than 6 months may be downgraded to a lower tier while data that has a history of frequent use may be upgraded, automatically.

The database/storage manager 140 modifies data classification values associated with each portion of stored data. The granularity of the classification may also vary. According to one embodiment of the present invention, the classification of data may be at the byte level while in another embodiment it may be at the file level. Indeed there are numerous implementation models for the classification of data that will be recognized by one skilled in the relevant art.

As the difference in cost of storing data on the various types of storage mediums narrows, it becomes more and more costly to move data. Not only is the cost of maintaining and accessing the data on the medium to be considered, but so must the bandwidth cost of moving data from one storage medium to another. Indeed the moving, reading and writing of data on various storage mediums can restrict the actual use of the data. Embodiments of the present invention address this growing cost by substantially fixing data portions to a particular medium.

Other embodiments of the present invention combine the movement of select portions of data to various storage mediums. Such transport can be accomplished after data classification alone fails to adequately manage the data. For example, flash memory is inherently faster and more expensive than tape memory. There remains a need to minimize data on flash memory; therefore data will likely continue to be moved from one form of storage medium to another based on the immediate need for the data. However, this movement can be minimized by expanding the range of resource use by each type of storage medium. No longer is it necessary that a storage medium access and transport data at a maximum rate. Embodiments of the present invention offer the ability to manage the resources expended at each storage medium based on the classification of the data.

Figure 2:
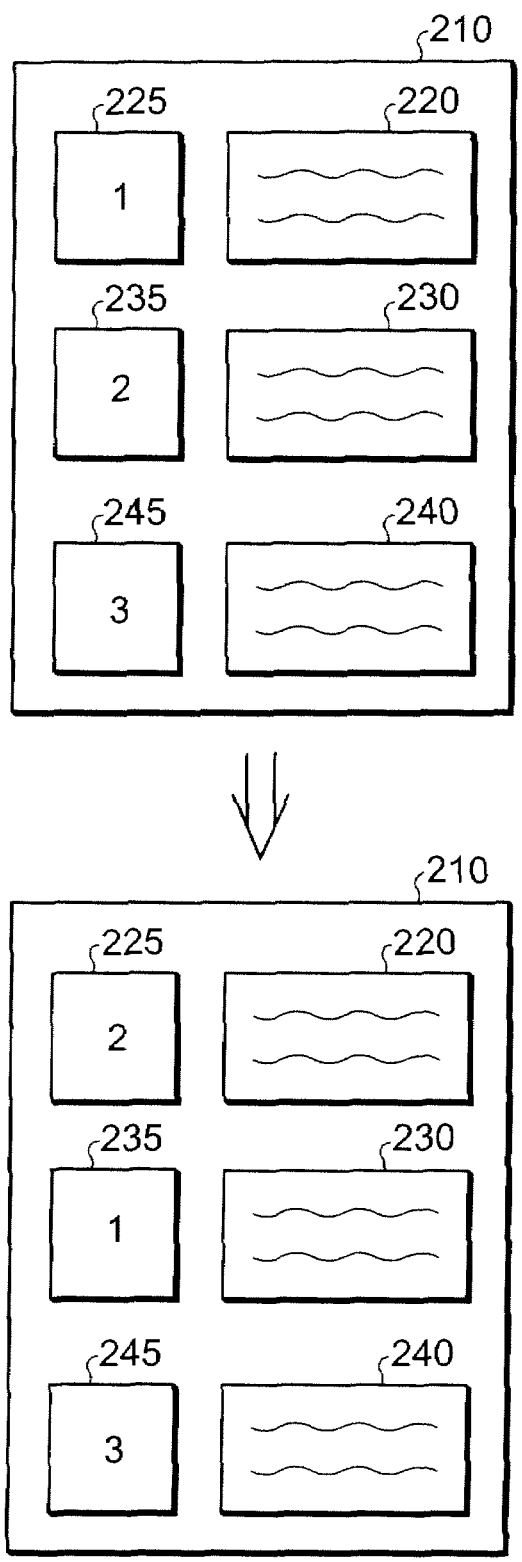
FIG. 2 shows a high level block diagram of a storage medium having three data portions and three classification portions according to one embodiment of the present invention.

FIG. 2 is a high level diagram of a storage medium in which one embodiment of the present invention for dynamic data classification has been implemented. A storage medium 210 includes three data portions 220, 230, 240. Associated with each data portion, and for the purpose of this example collocated with the data, are three data classifications 225, 235, 245. Each data classification is associated with one data portion. For example, the top data portion 220 is associated with the top data classification 225 and so forth. The upper portion of FIG. 2 represents an initial state of the data on the storage medium 210. Each data portion has a different data classification level. In this case, moving top to bottom, the data classification is 1, 2 and 3 respectively.

According to one embodiment of the present invention, the classifications 225, 235, 245 of the data portions 220, 230, 240, respectively, resident on the storage medium 210 are altered based on the need to access and use the data. In this example, the upper most data portion 220 is downgraded to a level 2 classification while the middle data portion is upgraded to level 1. The lower portion of data 240 remains at a level 3. Note that the data itself has not moved. This is not only true for this single storage medium; the concept can be carried over to a plurality of storage mediums of different types and differing capabilities.

Figure 3:
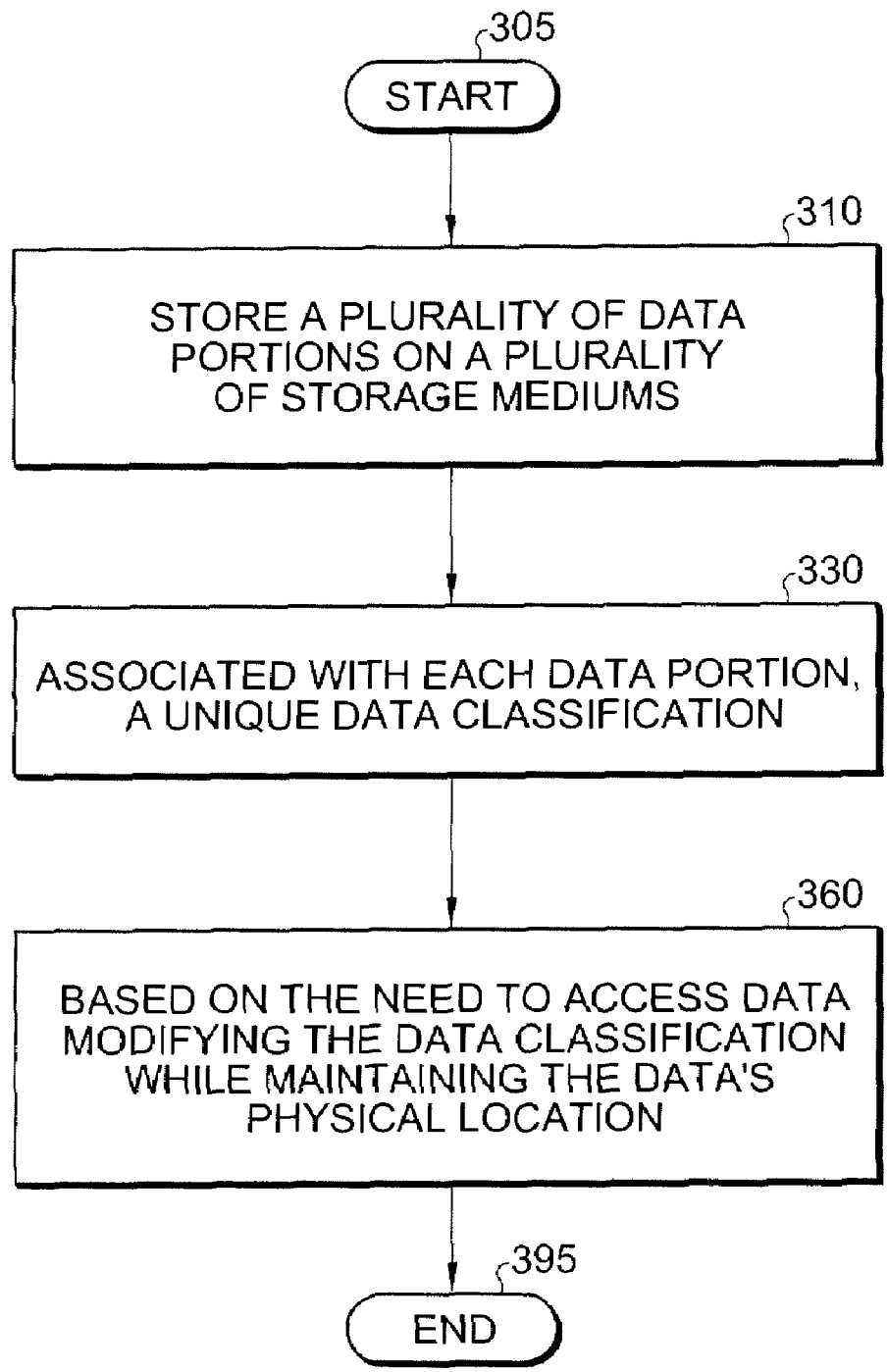
FIG. 3 is a flowchart of one method embodiment for dynamic data classification according to the present invention.

FIG. 3 is a flowchart illustrating methods of implementing an exemplary process for dynamically modifying data classification. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

FIG. 3 shows a method for one embodiment of dynamically modifying the classification level of data. The process begins 305 with the storage 310 of data on a variety of storage mediums. In most organizations, data is placed on a variety of storage mediums. These mediums range from quickly accessible flash drives, to disk drive (both optical and magnetic) to slow and less expensive tape.

At substantially the same time that the data is stored, the data is associated 330 with a data classification. The data classification identifies to the storage medium the degree to which the storage medium resources must be utilized to access the data. Those data portions classified as being highly in need of quick access will drive the storage medium to dedicate most, if not all, of its resources to access that data when called upon. Data of a lower classification will be given a diminished portion of resources.

According to one embodiment of the present invention, the classification levels of the data resident on a storage medium can be dynamically modified 360 to facilitate data and system management, terminating this example 395. Data whose access is not time sensitive can remain on the same medium but be allocated only a portion of the access resources and a limited portion of bandwidth resources to convey the data. Rather than the storage medium operating at maximum capacity and conveying all the data on the system network as it is accessed, the flow of the data is controlled. Other embodiments beyond this example may combine the movement of some data with a logical classification of the data as described herein.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver and/or in every and any other way known now or in the future to those of skill in the art of computer programming. Additionally, the present invention is in no way limited to implementation in any specific programming language, or for any specific operating system or environment.

While there have been described above the principles of the present invention in conjunction with dynamic classification of data portions, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for dynamic classification of data, the system comprising:
    a plurality of storage media;
    a plurality of data portions stored among the plurality of storage media, wherein each data portion is associated with a data classification, and wherein each data classification conveys a level of resources to be used by a storage medium during access of an associated data portion from the storage medium; and
    a data classification module communicatively coupled to the plurality of storage media, wherein the data classification module is configured to dynamically modify each data classification as a function of a need for its associated data portion from a respective storage medium;
    wherein responsive to an increase in need for a data portion, the data classification module is operable to dynamically modify the data classification of the data portion in a manner indicating that a greater level of resources of an associated storage medium are to be expended during a subsequent access of the data portion; and
    wherein responsive to a decrease in need for a data portion, the data classification module is operable to dynamically modify the data classification of the data portion in a manner indicating that a lower level of resources of an associated storage medium are to be expended during a subsequent access of the data portion.

2. The system of claim 1, wherein each data classification describes characteristics of its associated data portion.

3. The system of claim 1, wherein each data classification is metadata of its associated data portion.

4. The system of claim 1, wherein each data classification and its associated data portion are collocated on one of the plurality of storage media.

5. The system of claim 1, wherein each data classification and its associated data portion are located apart.

6. A computer implemented method for dynamic classification of a plurality of data portions in a storage system, each data portion being stored in one of a plurality of storage media of the storage system, and the method comprising:

associating a first data classification with a first data portion of the plurality of data portions, wherein the first data portion is stored on a first storage medium of the plurality of storage media, and wherein the first data classification identifies a first priority of resources to be expended with respect to retrieval of the first data portion from the first storage medium; and replacing the first data classification with an updated first data classification responsive to a change in demand for the first data portion, wherein the updated first data classification identifies a different priority of resources to be expended with respect to retrieval of the first data portion from the first storage medium, wherein the updated first data classification indicates that a greater quantity of resources of the first storage medium are to be expended during a subsequent access of the first data portion responsive to the change in demand being an increase in demand for the first data portion, and wherein the updated first data classification indicates that a lower quantity of resources of the first storage medium are to be expended during a subsequent access of the first data portion responsive to the change in demand being a decrease in demand for the first data portion.

7. The computer implemented method of claim 6, wherein the first storage medium includes a plurality of classification levels and wherein each level is associated with differing allocation of storage medium resources.

8. The computer implemented method of claim 6, wherein the first data classification and the first data portion are collocated on the first storage medium.

9. The computer implemented method of claim 6, wherein the first data classification and the first data portion reside at different locations.

10. A computer-readable storage medium tangibly embodying a program of instructions executable by a machine wherein said program of instruction comprises a plurality of program codes for dynamic classification of data, said program of instructions comprising:

one of said program codes for associating a data classification with a data portion, wherein the data portion is stored on a storage medium, and wherein the data classification identifies a degree to which resources of the storage medium are to be utilized to provide access to the data portion on the storage medium; and one of said program codes for modifying the data classification associated with the data portion free of moving the data portion from the storage medium, wherein the modified data classification identifies a different degree to which resources of the storage medium are to be utilized to provide access to the data portion on the storage medium, wherein the program code for modifying the data classification modifies the data classification of the data portion in a manner indicating that a greater level of resources of the storage medium are to be expended during a subsequent access of the data portion responsive to an increase in need for the data portion, and wherein the program code for modifying the data classification modifies the data classification of the data portion in a manner indicating that a lower level of resources of the storage medium are to be expended during a subsequent access of the data portion responsive to a decrease in need for the data portion.

11. The computer-readable storage medium of claim 10, wherein the program code for associating a data classification assigns the data portion to one of a plurality of classification levels, and wherein each level is associated with differing allocation of storage medium resources.

12. The computer-readable storage medium of claim 10, wherein the data classification and the data portion are collocated on the storage medium.

13. The computer-readable storage medium of claim 10, wherein the data classification and the data portion reside at different locations.

14. The system of claim 1, wherein each storage medium resides at a physical location, and wherein the data classification module dynamically modifies a data classification of a data portion in a manner that is free of moving the data portion to a different physical location.

15. The computer implemented method of claim 6, further comprising:

associating a second data classification with a second data portion of the plurality of data portions, wherein the second data portion is stored on the first storage medium.

16. The computer implemented method of claim 15, further comprising:

replacing the second data classification with an updated second data classification responsive to a change in demand for the second data portion, wherein the updated second data classification identifies a different priority of resources to be expended with respect to retrieval of the second data portion from the first storage medium.

17. The computer implemented method of claim 6, wherein the first storage medium comprises one of flash memory, a magnetic disk device, and a magnetic tape device.

18. The computer implemented method of claim 6, further comprising:

moving the first data portion from the first storage medium to a second storage medium of the plurality of storage media responsive to the updated first data classification failing to address a changed demand for the first data portion.

19. The system of claim 1, wherein the resources comprise at least one of access resources and bandwidth resources.

20. The computer-implemented method of claim 6, wherein the resources comprise at least one of access resources and bandwidth resources.

* * * * *